US009353476B2

(12) United States Patent
Henriksson et al.

(10) Patent No.: US 9,353,476 B2
(45) Date of Patent: May 31, 2016

(54) METHOD FOR RECYCLING WASTE MATERIAL WITH REDUCED ODOR EMISSION

(71) Applicant: GEORGIA-PACIFIC CONSUMER PRODUCTS LP, Atlanta, GA (US)

(72) Inventors: David Christer Henriksson, Marietta, GA (US); Wayne Frederick Winkler, DePere, WI (US); Bradley E. Lucas, Menasha, WI (US)

(73) Assignee: GEORGIA-PACIFIC CONTAINERBOARD LLC, Atlanta, GA (US)

( * ) Notice: Subject to any disclaimer, the term of this patent is extended or adjusted under 35 U.S.C. 154(b) by 0 days.

(21) Appl. No.: 14/256,652

(22) Filed: Apr. 18, 2014

(65) Prior Publication Data

US 2015/0299950 A1     Oct. 22, 2015

(51) Int. Cl.
*D21C 5/02*     (2006.01)
*D21B 1/32*     (2006.01)

(52) U.S. Cl.
CPC ............... *D21B 1/32* (2013.01); *Y02W 30/646* (2015.05)

(58) Field of Classification Search
CPC .......... D21C 5/02; D21C 11/08; D21C 11/06; A61L 11/00; A61L 2/06; A61L 2/18; D21B 1/32; B01D 53/52; B03B 9/06
USPC ......... 162/4–5, 29, 41, 43, 51–53, 57–58, 60; 422/4–5, 26, 30, 32, 38; 210/767, 808, 210/928
See application file for complete search history.

(56) References Cited

U.S. PATENT DOCUMENTS

| | | | |
|---|---|---|---|
| 2,709,133 A * | 5/1955 | Tremaine et al. ................ | 162/51 |
| 2,839,399 A * | 6/1958 | Gearhart et al. ................ | 162/51 |
| 3,376,102 A * | 4/1968 | Venemark ...................... | 423/232 |
| 3,532,595 A * | 10/1970 | Sanberg et al. ................. | 162/47 |
| 3,595,741 A * | 7/1971 | Goss ................................ | 162/5 |
| 3,745,063 A * | 7/1973 | Fisher ............................ | 162/15 |
| 3,842,160 A * | 10/1974 | August et al. ............. | 423/243.09 |
| 3,969,184 A * | 7/1976 | Cederquist ..................... | 162/19 |
| 3,969,479 A * | 7/1976 | Lonnes et al. ................ | 423/210 |
| 4,048,007 A * | 9/1977 | Valle-Riestra .................. | 162/57 |
| 4,072,273 A * | 2/1978 | Reiniger ......................... | 241/19 |
| 4,505,776 A * | 3/1985 | Murray ........................... | 162/51 |
| 4,553,977 A | 11/1985 | Fry | |
| 4,974,781 A | 12/1990 | Placzek | |
| 4,983,549 A | 1/1991 | Greve | |
| 5,026,403 A | 6/1991 | Michel-Kim | |
| 5,119,994 A * | 6/1992 | Placzek .......................... | 241/17 |
| 5,122,228 A * | 6/1992 | Bouchette et al. .............. | 162/4 |
| 5,277,758 A | 1/1994 | Brooks et al. | |
| 5,351,895 A | 10/1994 | Brooks et al. | |
| 5,358,185 A * | 10/1994 | Konecsny ...................... | 241/18 |
| 5,390,860 A | 2/1995 | Ali et al. | |
| 5,424,033 A | 6/1995 | Roland | |
| 5,635,026 A * | 6/1997 | Kettunen et al. ................ | 162/19 |
| 5,650,045 A * | 7/1997 | Salminen ........................ | 162/19 |
| 5,795,479 A * | 8/1998 | Vogt et al. ...................... | 210/603 |
| 5,821,553 A | 10/1998 | Evans et al. | |
| 5,900,111 A * | 5/1999 | Nystrom et al. ................. | 162/6 |
| 5,989,387 A * | 11/1999 | Hyoty et al. .................... | 162/15 |
| 6,150,577 A | 11/2000 | Miller et al. | |
| 6,458,240 B1 | 10/2002 | Bouchette et al. | |
| 6,730,223 B1 | 5/2004 | Anderson et al. | |
| 7,264,124 B2 | 9/2007 | Bohlig et al. | |
| 7,341,156 B2 | 3/2008 | Bohlig et al. | |
| 7,531,703 B2 | 5/2009 | Ramesh et al. | |
| 7,584,856 B2 | 9/2009 | Miller et al. | |
| 7,611,018 B2 | 11/2009 | Bohlig et al. | |
| 7,626,062 B2 | 12/2009 | Carner | |
| 7,638,070 B2 | 12/2009 | Johnson et al. | |
| 7,648,561 B2 | 1/2010 | Szente et al. | |
| 7,658,820 B2 * | 2/2010 | Lawrence et al. ............. | 162/246 |
| 7,745,208 B2 | 6/2010 | Noll | |
| 7,784,399 B2 | 8/2010 | Sasine et al. | |
| 7,799,835 B2 | 9/2010 | Smith et al. | |
| 7,810,646 B2 | 10/2010 | Miller et al. | |

(Continued)

FOREIGN PATENT DOCUMENTS

DE     4336272 A1 *    4/1995
EP       608949 A1 *    8/1994

(Continued)

OTHER PUBLICATIONS

Machine Translation of KR 20-1999-0004845 U, published on Feb. 1999.*
Yamashita, Kyoko et al., "Compositions of Volatile Organic Compounds Emitted from Melted Virgin and Waste Plastic Pellets", Journal of the Air & Waste Management Associate 59, 2009, pp. 273-278.
United States Environmental Protection Agency, Decision Document: Approval of Fiberight Municipal Solid Waste Separation Plan, Jun. 2012.
PCT/US2015/026295, International Search Report and Written Opinion, Jun. 29, 2015 (13 pages).

*Primary Examiner* — Jose Fortuna

(57) ABSTRACT

A method for recycling waste material including waste paper comprises the steps of introducing the waste material into a pressure vessel, re-pulping the waste paper in the pressure vessel at an elevated processing temperature and pressure to form a treated waste material including substantially re-pulped waste paper, thereafter introducing cooling water into the pressure vessel so as to cool the treated waste material in the pressure vessel to a discharge temperature below the elevated processing temperature and reduce odor emitted by the treated waste material, and thereafter discharging the treated waste material from the pressure vessel. The recovered paper pulp fraction is suitable as a feedstock in the manufacture of a variety of paper products including paper tissue and paper towel products.

20 Claims, 4 Drawing Sheets

(56) References Cited

U.S. PATENT DOCUMENTS

| | | | |
|---|---|---|---|
| 7,892,500 B2 | 2/2011 | Carner | |
| 7,918,967 B2 * | 4/2011 | Jiang et al. | 162/248 |
| 7,932,424 B2 | 4/2011 | Fujimoto et al. | |
| 8,100,990 B2 | 1/2012 | Ellens et al. | |
| 8,127,933 B2 | 3/2012 | Bohlig et al. | |
| 8,217,210 B2 | 7/2012 | Agrawal et al. | |
| 8,230,780 B2 | 7/2012 | Sasine et al. | |
| 8,307,770 B2 | 11/2012 | Clarke et al. | |
| 8,322,639 B2 | 12/2012 | Gitschel | |
| 8,344,195 B2 | 1/2013 | Srinakruang | |
| 8,350,104 B2 | 1/2013 | Fujimoto et al. | |
| 8,354,005 B2 | 1/2013 | Kasin | |
| 8,664,458 B2 | 3/2014 | Kumar et al. | |
| 2002/0060014 A1 | 5/2002 | Sipila et al. | |
| 2002/0096269 A1 * | 7/2002 | Bouchette et al. | 162/4 |
| 2003/0178345 A1 | 9/2003 | Hautala et al. | |
| 2004/0256071 A1 | 12/2004 | Huhtamaki et al. | |
| 2005/0080520 A1 | 4/2005 | Kline et al. | |
| 2007/0034344 A1 * | 2/2007 | Reilama et al. | 162/51 |
| 2007/0179326 A1 | 8/2007 | Baker | |
| 2008/0294132 A1 * | 11/2008 | Tan et al. | 604/360 |
| 2009/0029074 A1 | 1/2009 | Sasine et al. | |
| 2009/0148629 A1 | 6/2009 | Sasine et al. | |
| 2009/0152173 A1 | 6/2009 | Miller et al. | |
| 2009/0211892 A1 | 8/2009 | Cunningham et al. | |
| 2009/0215000 A1 | 8/2009 | Boots et al. | |
| 2010/0264079 A1 | 10/2010 | Begin et al. | |
| 2011/0008865 A1 | 1/2011 | Lee | |
| 2011/0056952 A1 | 3/2011 | Borowski et al. | |
| 2011/0057341 A1 | 3/2011 | Meier | |
| 2011/0121112 A1 | 5/2011 | Alford | |
| 2012/0048974 A1 | 3/2012 | Gitschel | |
| 2012/0092475 A1 | 4/2012 | Li | |
| 2012/0145051 A1 | 6/2012 | Sweeney | |
| 2012/0160741 A1 | 6/2012 | Gong et al. | |
| 2012/0190102 A1 | 7/2012 | Gitschel et al. | |
| 2012/0204483 A1 | 8/2012 | Van den Heuvel et al. | |
| 2012/0217328 A1 | 8/2012 | Bohlig et al. | |
| 2012/0261247 A1 | 10/2012 | McNamara et al. | |
| 2012/0269991 A1 | 10/2012 | Sasine et al. | |
| 2013/0008323 A1 | 1/2013 | Sasine et al. | |
| 2013/0029394 A1 * | 1/2013 | Toll et al. | 435/167 |
| 2013/0309143 A1 | 11/2013 | Michalek et al. | |
| 2015/0299950 A1 * | 10/2015 | Henriksson | D21B 1/32 162/4 |

FOREIGN PATENT DOCUMENTS

| | | | |
|---|---|---|---|
| EP | 1118706 A2 * | 7/2001 | D21C 5/02 |
| JP | 2000157949 A * | 6/2000 | |
| KR | 20-1999-0004845 | 2/1999 | |
| WO | 03/024633 A1 | 3/2003 | |
| WO | 03104354 A1 | 12/2003 | |
| WO | 2008007204 A1 | 1/2008 | |
| WO | 2012010223 A8 | 1/2012 | |
| WO | 2012085880 A3 | 6/2012 | |

\* cited by examiner

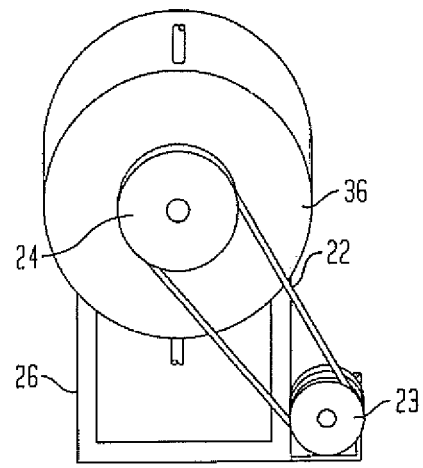
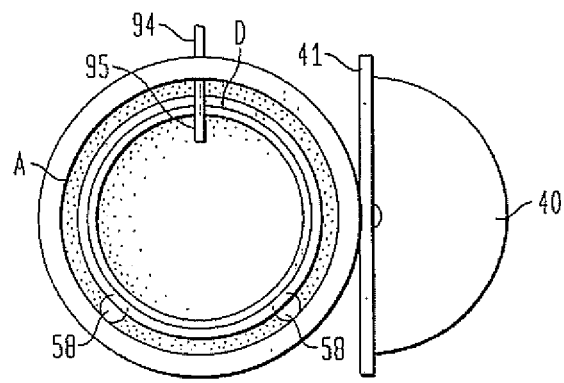
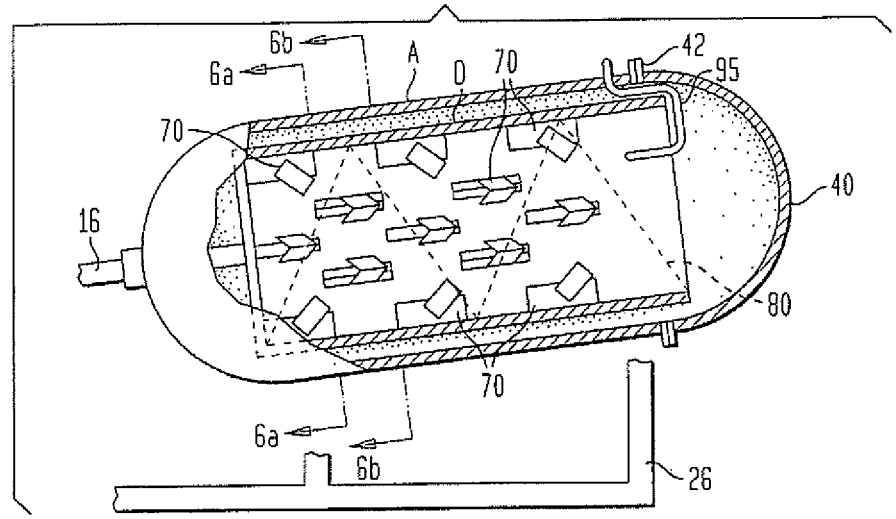

METHOD FOR RECYCLING WASTE MATERIAL WITH REDUCED ODOR EMISSION

FIELD OF THE INVENTION

The present invention relates generally to treating waste paper for use in recycled paper products. More specifically, this invention relates to a process for preparing recycled paper pulp from waste material that includes or forms odorous compounds during processing.

BACKGROUND OF THE INVENTION

Recycled waste paper is a major source of feedstock for the manufacture of paper products. Some waste materials, such as municipal, commercial and residential waste, include odorous compounds in addition to waste paper or may form odorous compounds during the processing of the waste paper materials, or both, and odors emitted by such odorous compounds may be undesirable or offensive. Accordingly, there is a need for a method for recycling waste material, including waste paper, with reduced odor emission.

SUMMARY OF THE INVENTION

The foregoing need is met by the present invention which provides a method for recycling waste material, including waste paper, comprising the steps of introducing the waste material into a pressure vessel, re-pulping the waste paper in the pressure vessel at an elevated processing temperature and pressure to form a treated waste material including substantially re-pulped waste paper, thereafter introducing cooling water into the pressure vessel so as to cool the treated waste material in the pressure vessel to a discharge temperature below the elevated processing temperature and reduce odor emitted by the treated waste material, and thereafter discharging the treated waste material from the pressure vessel. The recovered paper pulp fraction is suitable as a feedstock in the manufacture of a variety of paper products including but not limited to tissue, towel and packaging products.

These and other objects, features and advantages will become more apparent from the description provided below.

BRIEF DESCRIPTION OF FIGURES

The invention is described in detail below in connection with numerous embodiments and figures. In the Figures:

FIG. 3 is an end view in elevation of the pressure vessel of FIG. 1; this view showing the drive belt and motor used for driving the drum in rotation;

FIG. 4 is an end view of the vessel of FIG. 1, illustrating operation of the closure panel.

FIG. 5 is a side elevational view of the apparatus of FIG. 1, in partial section, showing lifting paddles disposed in a spaced array around the interior of the rotating drum, with the location of a helical baffle being indicated by the use of dashed lines;

DETAILED DESCRIPTION OF THE INVENTION

Figure 1:
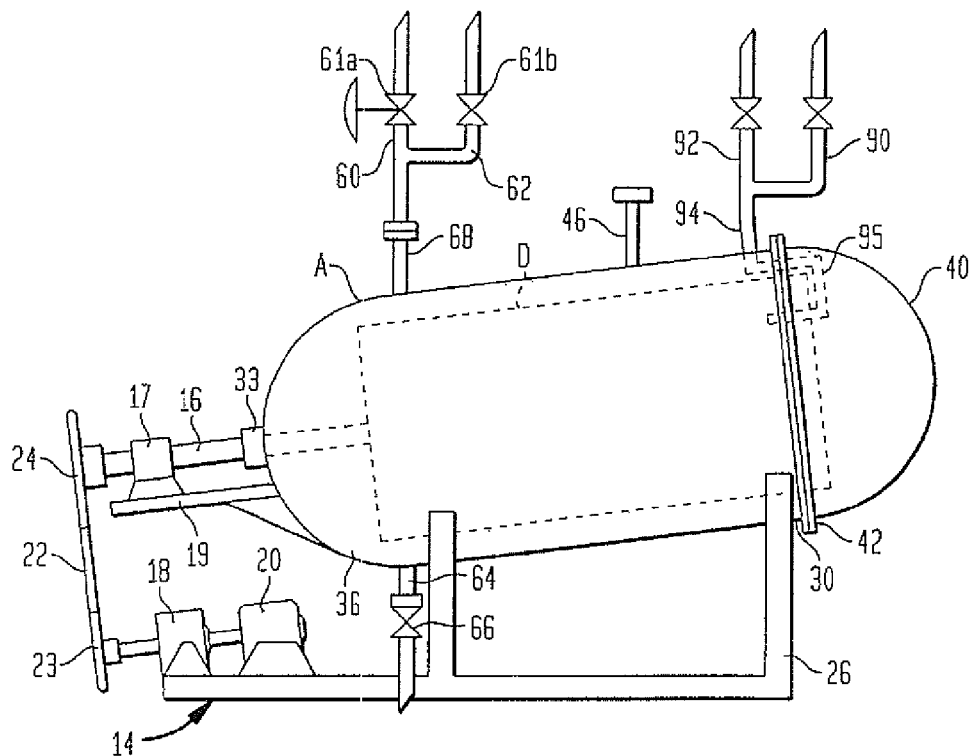
FIG. 1 is a side elevational view of a pressure vessel used in one of the preferred embodiments of this invention.
Figure 2:
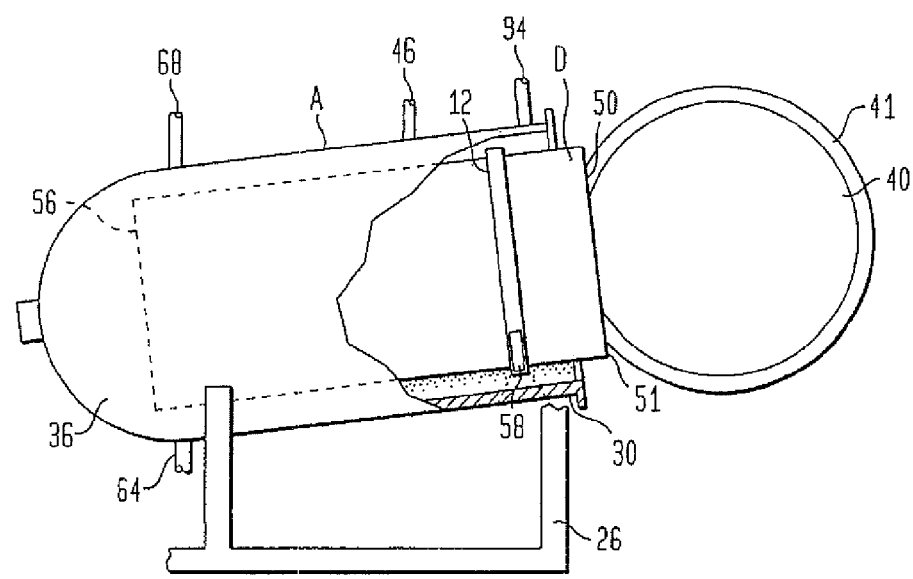
FIG. 2 is a view of the vessel of FIG. 1, in partial section, showing the rotating drum, and showing the vessel's closure panel in the open position.

The present invention is described in detail in connection with various embodiments for purposes of illustration only. Parameters of different steps, components, and features of the embodiments are described separately, but may be combined consistently with this description and claims, to enable other embodiments as well to be understood by those skilled in the art. Various terms as used herein are likewise defined in the description which follows. Concentrations in percent are in weight percent unless the context indicates otherwise.

As summarized above, this invention provides a method for recycling waste material including waste paper, comprising the steps of introducing the waste material into a pressure vessel, re-pulping the waste paper in the pressure vessel at an elevated processing temperature and an elevated processing pressure to form a treated waste material including substantially re-pulped waste paper, thereafter introducing cooling water into the pressure vessel so as to cool the treated waste material in the pressure vessel to a discharge temperature below the elevated processing temperature and reduce odor emitted by the treated waste material, and thereafter discharging the treated waste material from the pressure vessel. The recovered paper pulp fraction is suitable as a feedstock in the manufacture of a variety of paper products including but not limited to paper tissue, towel and packaging products.

The addition of the cooling water reduces or eliminates odor that is or would otherwise be emitted when the treated waste material is discharged. Water and the treated waste material in the pressure vessel form a treated waste material slurry in the pressure vessel. While not wishing to be bound by theory, it is believed that the cooling water reduces the odor by reducing the temperature of the treated material or diluting the treated material slurry or both. It is also believed that the cooling water absorbs odorous compounds in the treated material. Such odorous compounds may be present in the waste material or are produced during re-pulping of the treated waste material slurry or both. In some embodiments of this invention, sources of odorous compounds include food or beverage waste or both.

The term "re-pulp" means to detach or at least partially separate from one another fibers that have been attached to, bonded with, or entangled with one another such as are cellulosic fibers in paper. In the context of this description, re-pulping paper means to at least partially separate cellulosic fibers of paper from one another to form a loose cellulosic fiber pulp.

According to an embodiment of this invention, a process is provided for recycling waste material, including waste paper and polymeric waste material, utilizing a pressure vessel of generally cylindrical configuration mounted to be driven in inclined rotation about its longitudinal axis, said process comprising the steps of: a) introducing the waste material and dilution water through an inlet of the pressure vessel; b) adding thermal energy to the waste material in the pressure vessel to impart an elevated processing temperature and an elevated processing pressure to the waste material inside the pressure vessel to a level above atmospheric pressure; c) rotating the pressure vessel about its longitudinal axis, so as to agitate the waste material to accomplish re-pulping of the fibrous paper fraction; d) de-pressurizing the vessel by venting the steam through a condenser followed by pulling a vacuum on the condenser in order to begin the cooling of the material e) thereafter introducing cooling water into the pressure vessel so as to cool the treated waste material in the pressure vessel to a discharge temperature below that achievable in the previous step and reduce odor emitted by the treated waste material; and f) discharging the treated waste material from the pressure vessel, wherein said paper fraction is substantially re-pulped and substantially detached from said polymeric waste material and other contaminants in said waste materials. In an embodiment of the invention, the polymeric waste material is operative to concentrate contaminants including color bodies from the waste material.

According to yet another embodiment of this invention, a process is provided wherein a rotating apparatus referred to in the art as a Rotoclave® apparatus (available from Tempico, Inc., Madisonville, La., USA) is used. A desired amount of waste material is placed into a drum of the rotoclave by allowing rotational motion of augured vanes in the drum to draw the waste material into a chamber of the drum. The waste material includes waste paper and one or more odorous compounds or material that forms one or more odorous compounds during re-pulping. The pressure vessel door is closed and sealed, dilution water is added, and a vacuum is drawn in the chamber to eliminate the effects of the partial pressure of air trapped in the vessel. The rotoclave chamber is then isolated and steam is introduced through a steam inlet valve until the desired processing temperature and pressure are reached. The rotoclave drum is rotated while the waste material is contained in the drum at the desired processing temperature and pressure for a preset reaction time to form a treated waste material. Steam is used to maintain the temperature and pressure throughout the preset reaction time. After the preset reaction time, a steam valve for introducing the steam into the drum is closed and the drum is vented to atmospheric pressure, which, in turn, also reduces the temperature in the chamber. Following the first venting step, a vacuum is drawn to further reduce the temperature of the treated waste material. The drum is then vented to the atmosphere again and a cooling water is thereafter introduced into the chamber to further cool the treated waste material to a discharge temperature and dilute the one or more odorous compounds and the chamber is opened. The treated material inside the drum is then removed by reversing the drum rotation so that the augur vanes deliver the treated material to the front of the drum where it then exits onto a discharge conveyor for further screening to remove the coarse material.

Pressure Vessel

In accordance with an embodiment of this invention, the pressure vessel generally may be an elongated vessel of cylindrical configuration mounted to be driven in rotation about its longitudinal axis, the vessel having an inlet at one end and an outlet at the other end, and is provided with agitating means including an array of fixed lifting paddles present in the interior of said vessel. The agitation of the waste materials may comprise the action of the lifting paddles in the vessel, concurrent with rotation of said vessel. In accordance with an embodiment of this invention, the vessel may be provided with a helically configured member.

Any suitable pressure vessel that can bring about the needed effects in processing the waste material of this invention may be employed in connection with this invention. According to an embodiment of this invention, however, the pressure vessel may be equipped advantageously with suitable agitating means to facilitate proper agitation of the waste material. A suitable pressure vessel in accordance with an embodiment of this invention is a pressure vessel of generally cylindrical configuration mounted to be driven in inclined rotation about its longitudinal axis as disclosed in U.S. Pat. Nos. 5,119,994; 4,974,781; and 6,458,240, the disclosures of which are incorporated herein by reference in their entirety. Such a pressure vessel is equipped with suitable means for agitation to uniformly mix the waste material and break up the plastic-containing and paper-containing waste materials. Examples of suitable agitating means include mechanical, hydromechanical or electrical devices. Specific examples of mechanical devices include mechanical stirrers, shakers, blenders, tumblers, and the like. It has been found that an array of fixed lifting paddles and a helically configured member mounted in an interior section of a pressure vessel cooperate as one example of agitating means for an embodiment of this invention. According to an embodiment, the agitating means is provided within a drum, which is rotatably mounted at an incline inside a pressure vessel.

Thus, an apparatus in accordance with an embodiment of this invention involves the generally cylindrical vessel mounted at a slight angle of incline with respect to the horizontal plane, with the angle of incline being of an embodiment of about 7°, the upper end of the vessel having an opening to receive waste material and the lower end of the vessel being closed. The vessel may be designed with a highly effective closure device on the opening that, when closed, seals the vessel from the atmosphere to allow a buildup of pressure to occur within the vessel during its operation, or, alternatively, permit a vacuum to be maintained within the vessel by the functioning of an appropriate vacuum system.

As the drum is rotated in accordance with an embodiment of this invention, the waste material in the drum is believed to be tumbled in contact with the sidewall of the drum, a distance equal to the angle of repose of the materials times the coefficient of friction of the materials times the rate of rotation of the drum. According to an embodiment, the angle of repose of the treated material is approximately 45° and the coefficient of friction is approximately 0.2.

Referring to FIGS. 1-9, there is shown an apparatus for practicing a process in accordance with an embodiment of the present invention as disclosed in U.S. Pat. No. 6,458,240. The apparatus includes a heavy walled processing pressure vessel A that is generally cylindrical in configuration. Heavy walls are used in the construction of the pressure vessel A in order that it can operate under conditions of high internal pressure as well as on occasion, under vacuum conditions as noted above. The pressure vessel A is mounted in a non-rotatable manner on a sturdy stationary support 26 and has a sufficiently wide base as to give ample stability. The support 26 may utilize structural steel members designed to effectively transfer the weight of the processor and its contained materials to the foundation under the processor.

The rotating drum about to be described, that is utilized within the shell of the vessel A, transfers its forces to carrier and support bearings, which in turn transfer that load into the shell of the vessel A and become a part of the load supported by the structural supports of the shell, and thus transferred to the foundation below the processor.

A closure device or dome shaped door 40, provided with a seal 41, is hingedly mounted adjacent the inlet 30 of the vessel A so that substantial pressure or a vacuum can be established inside the vessel at selected times, as mentioned previously.

Located inside the non-rotating vessel A is a generally cylindrical drum D mounted so as to be rotatable in either direction on its axis, which axis is coincident with the axis of the vessel A. Drum D is provided with a riding ring or support ring 12 adjacent to its front end 50, with rollers or trunnion bearings 58 being positioned on the interior of vessel A to contact the ring 12, and thus provide support for the front end 50 of the drum D. The front end 50 of the drum D is open, whereas the rear or lower end 56 of the drum is closed and watertight.

Affixed to the rear or lower end 56 of the drum D is drive shaft 16, which is arranged to support the rear end of the drum D and drive it in rotation. The shaft is rotatably supported by roller or ball bearings 17 that are in turn supported from a structural member 19 attached to the vessel A. This support arrangement is designed to fix the location of the drum D insofar as its horizontal positioning within the vessel A is concerned.

The drive shaft 16 of the drum D penetrates the shell of the vessel A and is sealed from the atmosphere by a seal 33 to enable a selected pressure or a selected vacuum to be maintained from time to time within the vessel A, and of course within the drum D.

The typical rate of rotation for the drum D is between 2 and 30 rpm and preferably approximately 8-15 rpm to facilitate a uniform loading of forces on the drive mechanism 14 utilized for driving the drum in rotation.

The drum D is capable of being rotated in either direction on its horizontal axis by means of the drive assembly 14 depicted in FIG. 1 that may, for example, utilize a reversible electric motor 20 and suitable reduction gearing 18 connected to the drive shaft 16 of the drum to turn the drum D in the selected direction. It is preferable to use a heavy duty chain 22 passing over sprockets 23 and 24 for transferring the rotation of the motor to the drive shaft, in an arrangement familiar to those knowledgeable in the art, as depicted in FIGS. 1 and 3.

By placing the drum D within the pressure vessel A, it is possible to have the same advantages of unobstructed agitation of materials as it would have had in a free-standing rotatable drum. By designing the drum to have adequate containing walls, the materials that are being processed and the additives to be inserted into those materials are contained within the drum during processing. Because, in accordance with this embodiment, the drum is disposed within a pressure vessel, the materials of construction of the drum are considerably lighter than are required for a free-standing, rotatable drum, which would have required the structural integrity to withstand the forces of pressure as well as the forces associated with the vacuum that will be utilized from time to time in the process.

The interior of drum D is equipped with a series of lifting paddles 70 and a helical flighting 80 to facilitate agitation and movement of waste materials as a consequence of rotation of the drum D. The lifting paddles used for the instant invention and the flighting are described in more detail below.

Vessel A, in accordance with this invention, is preferably operated on an incline. One suitable angle of incline is 7° from the horizontal, with the front or inlet end 30 being higher than the closed lower end 36 of the vessel. The angle of incline aids in containing the materials to be processed within the drum D in that the waste materials will be moved through the drum D toward the back end, at least partly under the influence of gravity as the drum is rotated.

Although there is no limitation for the size of drum D, it is to be noted that a device utilizing a drum approximately ten feet long is of a size that can be effectively utilized in a recycling station. In other words, a smaller sized version of a waste processor in accordance with this invention could take the form of a unit that could be placed within a relatively limited area, to handle smaller scale any special type waste materials generated therein.

At the same time, it is obviously possible to use larger units to perform large scale operations, and by the foregoing mention of a processor of a size to be used in a disposal facility is not intended to limit the largeness or smallness of any processor, except that the diameter of the vessel should be sufficiently large as to accept materials upon which a prior size reduction has not taken place. Any combination of reasonable diameters and lengths could be utilized in accordance with this invention, limited only by practicality.

Returning to the details of this invention, the lifting paddles 70 are mounted on the interior of the drum D and are arranged so as to minimize any obstruction of flow of materials within the drum. The lifting paddles are distributed in sections along the horizontal dimension of the drum, as shown in FIG. 5, and are staggered at approximately 45° intervals from one section to the next.

Figure 6A:
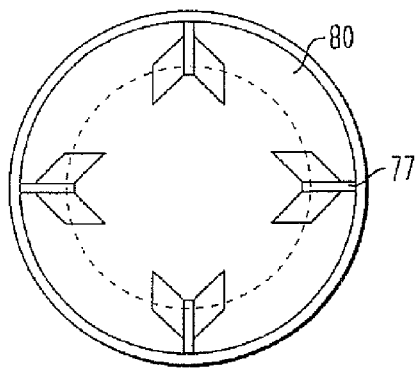
FIG. 6a is a cross sectional view taken along lines 6a-6a of FIG. 5.
Figure 6B:
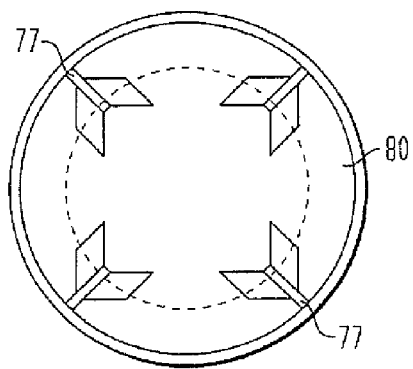
FIG. 6b is a cross sectional view taken along lines 6b-6b of FIG. 5.
Figure 7:
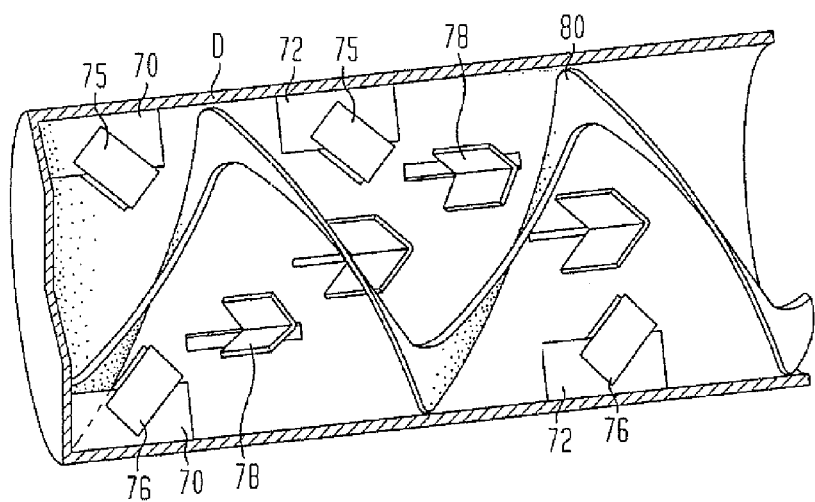
FIG. 7 indicates the relationship of the lifting paddles to the helical baffle disposed around the interior surface of the rotating drum of FIGS. 1-6b.

The lifting paddles 70 are affixed to the interior perimeter of the drum D perpendicular to the shell of the drum, as shown in FIGS. 6a and 6b, and are oriented lengthwise to correspond with the longitudinal dimension of the drum, as is shown in FIGS. 5 and 7.

Figure 8:
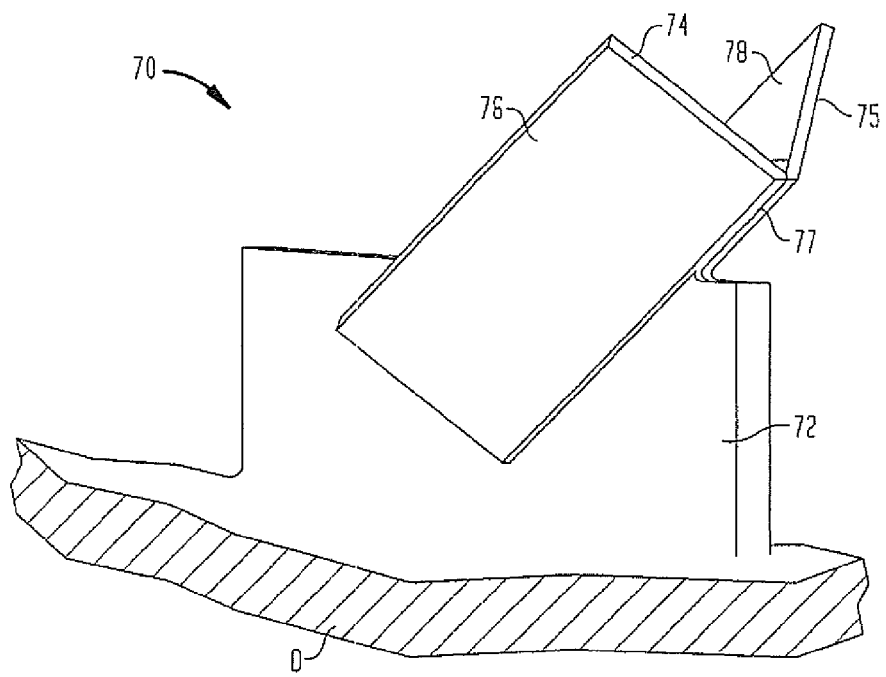
FIG. 8 is an enlarged scale drawing of a typical lifting paddle utilized in connection with this invention, also showing an adjacent portion of the drum in cross section, the closure panel end of the drum being toward the left as viewed in this figure.

As best seen in FIG. 8, the perpendicular leg 72 is affixed to the interior sidewall of the drum, and the angled member 74 is affixed at its midline 77 to the radially inner portion of the perpendicular leg. The angled member 74 has external surfaces 75 and 76, with surface 75 being at an angle of approximately 45° from the perpendicular leg 72 of the lifting paddle, and surface 76 being at a like angle to the leg 72. The surfaces 76 are preferably considered as the first portions, and the surfaces 75 of the paddles are considered as the second portions. The midline 77 of the angled member 74 may be at an angle of approximately 52° with respect to the interior surface of the drum D, and as shown in FIG. 8, the midline 77 is placed in a direction that is toward the higher end of the drum D. Stated somewhat differently, the interior portions 78 of the lifting paddles face the closed end 56 of the drum D, which is to the left as viewed from the perspective of FIG. 8.

In an embodiment, the angle of incline of the drum is about 7° with respect to the horizontal, so the angle of incline of the angular portions 75 and 76 of the lifting paddle is 52° with respect to the shell wall of the drum D, and this results in the angular portions 75 and 76 of the lifting paddle operating at an angle of 45° with respect to the horizontal.

The helical flighting or baffle 80 is affixed to the interior perimeter of the drum D so as to minimize obstruction of flow of waste material within the drum, and may be at a frequency corresponding to one complete cycle of the helix in a distance equal to the diameter of the drum, measured along the length of the drum. The angularity of the helical flighting is such that when the drum D is rotated in what is called the first rotative direction, the waste material to be processed is moved forward, toward the closed lower end 56 of the drum, whereas rotation of the drum in the second rotative direction causes the materials to be moved backward toward the inlet opening 50 of the drum. The helical flighting is continuous, meaning that occasional lifting paddles 70 must be eliminated at certain locations in order to make fabrication possible.

The size and frequency of the lifting paddles, the angle of incline of the drum and the rate of rotation of the drum are variable and are a function of the required rate of movement of materials within the drum and the amount of material to be processed in a given amount of time.

The diameter of the drum may be sufficient to accept a selected quantity of waste material to be processed, with an additional space of approximately 40 percent of the volume of the interior diameter of the drum needed to remain vacant to allow materials to fall and to mix within the drum as it rotates. In a design of this type of device, additional processing capacity is added to the processor by increasing its length. The ratio of diameter to length is variable and depends upon the amount of material to be processed in a given amount of time in concert with the size and frequency of the agitation mechanisms of the drum to insure complete mixing of waste material and water.

Devices for monitoring and controlling the process include, for example, water piping, steam piping, vacuum piping, pressure controllers and other needed instruments. In using a free-standing, rotatable drum, each of these devices may be affixed to the centerline of the axis of rotation of the rotatable drum, which complicates the closure devices on such a vessel and, by necessity, places these devices at the ends of the drum. In the case of pressure controllers, vacuum connections and temperature controlling instruments, this is not an appropriate location. Rather, devices of this type may better monitor and control the process from a location that is nearer to the point in the process where the reaction is taking place, and not adjacent to or at the opposite end of the injection of additives to the process. Thus, some embodiments utilize a pressure vessel in which a rotating drum is utilized.

Inducing pressure and vacuum further complicates the utilization of a free-standing, rotating drum. Vacuum, in particular, requires that the device have considerable strength to keep from collapsing, and this generally equates to massive components, requiring considerable horsepower if such components are to be driven in rotation.

Additionally, the introducing large objects that are generally not free-flowing, that are not conveniently reduced in size prior to their introduction to the process may require that the closure device be of large size. Because of their large size and because of the pressure and vacuum conditions of the process, the closure devices would be very difficult to handle manually. Automatic closure device operators that would be affixed to a free-standing, rotating drum can be complicated. In this embodiment, the drum is rotated for a time period during which the closure device is open, and thus, the closure device and its operator must not interfere with the ability of the drum to rotate under these circumstances.

With reference to FIG. 1, the vessel A is equipped with piping 90 for the selective addition of steam and piping 92 for the selective addition of both dilution and cooling water, with suitable valves being utilized in order to control the flow. The steam piping and the water piping are combined into a single injection pipe 94 as shown in FIG. 1, enabling steam and water to be conducted through the sidewall of the vessel A and then injected into the open end of the drum D, through curved fixed pipe 95.

Figure 9:
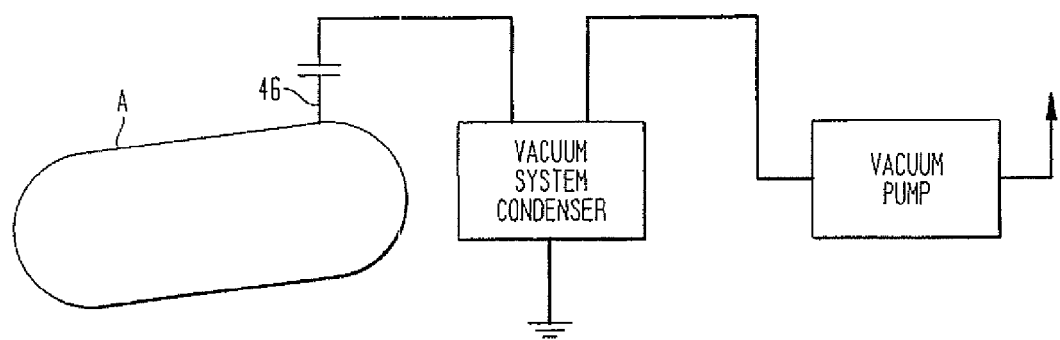
FIG. 9 is a schematic of a vacuum system used in connection with the present invention.

During one phase of the operation of the device, vacuum is induced into the vessel A by a vacuum system such as the type manufactured by Nash Engineering Company of Norwalk, Conn. or Croll-Reynolds Company, Inc. of Westfield, N.J., connected to the vessel by vacuum connection 46; note FIG. 9.

Waste Material Introduction

The waste material for producing recycled paper pulp in accordance with this invention includes at least waste paper. In accordance with an embodiment of this invention, suitable waste paper includes but is not limited to newspaper or other inked paper products, magazines, cartons, containers, cups, leaflets, flyers, envelopes, cardboard, boxes, bags, printed and unprinted paper sheets, posters, and the like. In accordance with another embodiment of this invention, the waste material may include one or more odorous compounds or material that forms one or more odorous compounds during re-pulping. Materials that include one or more odorous compounds or material that forms one or more odorous compounds during re-pulping include, but are not limited to food waste and beverage waste or both, along with possible polymeric waste materials such as plastic cups, plastic bottles, plastic containers, and the like. In accordance with still other embodiments of this invention, the waste material may include commercial waste, residential waste, sanitary waste or industrial waste.

In accordance with an embodiment of this invention, the waste material feedstock may include wastepaper and polymeric waste such as coated feedstock provided with latex coatings, fillers and the like. The coatings or polymeric components may include synthetic polymers such as acrylates and vinyl acetates or natural polymers and pastes of starch or organic pastes, as well as natural and synthetic adhesives. The polymeric material may be in the form of a coating, binder or simply be associated with the paper fiber component as in the case of packaging with a paperboard component and plastic film component. In accordance with certain embodiments, the waste material feedstock may include both cellulosic fiber-containing paper and a resinous polymeric component which is agglomerated during the process and operative to segregate other contaminants from the liberated papermaking fiber.

Additional specific examples of difficult-to-process waste materials processable in accordance with some embodiments of this invention include single and two side plastic coated board having wet strength resin, single and two side plastic coated board having no wet strength resin, two-sided glossy printer trimmings, ultraviolet (UV) cured ink coated stocks, and mixtures thereof. Further examples of plastic coated boards include two side coated (C2S) plastic food board having wet strength resin, such as milk cartons or other cartons used for dry food storage and the like. Further examples of plastic coated boards having no wet strength resin include ice cream containers, various other frozen food packages and the like. Still further examples include two-sided glossy photo trimmings, ice cream tops, unprinted colored paper, newspaper and the like.

Referring back to FIGS. 1-9 and in accordance with an embodiment of this invention, waste material including paper waste, and optionally plastic-containing waste, along with odorous or odor producing compounds is carried by a suitable conveyor and introduced through the inlet opening 30, when the door 40 has been moved to the open position, and into the open end 50 of the drum D. As the waste is not packaged in any particular size and may also contain an assortment of materials varying in size, shape and density, and which may not necessarily be free flowing, the inlet opening 30 in the vessel A and the opening 50 into the drum are large enough and without obstructions so as to allow previously unprocessed waste to be directly introduced into the processor.

The drum D is rotated in the first rotative direction while the waste is being conveyed into the drum, and, by virtue of the helical flighting 80 and the angle of incline of the drum, a sufficient amount of the material, though not free flowing, will be loaded into the drum for processing.

When the drum D has been filled with a sufficient amount of material to be processed, the closure device 40 is closed and is secured by a locking ring 42, such as the type manufactured by the Klinge Products Company of Denmark.

Generally, the weight percent of waste solids (that is, non-pulpable material) in the waste materials is in the range of about 1 weight percent to about 80 weight percent based on the total dry weight of the waste materials; whereas, the weight percent of waste solids in the waste materials may otherwise be in the range of about 20 weight percent to about 70 weight percent based on the total dry weight of the waste materials.

Typically, the waste paper contains no more than about 80 weight percent of polymeric waste material based on the total weight of paper pulp and polymeric waste material. In some cases, the waste materials contain less than about 10 percent of polymeric waste material based on the total weight of the pulp and the polymeric waste material.

As used herein, the terminology "polymeric", "plastic", "polymer" and like terms means and includes all organic, synthetic, natural or processed natural polymeric materials such as cellulose acetate, including resins, adhesives, foams, films, sheets and alloys (composites) that are molded, cast, extruded, drawn or laminated or otherwise applied onto or into objects or films. Such application may be carried out using any of the water or oil based lattices and by any of the known techniques in the art. Examples of coating techniques include blade coating, dip coating, spray coating, and the like. Specific examples of polymeric materials include addition polymers such as vinyl polymers, including acrylates and vinyl acetate, latexes thereof, polyolefins, condensation polymers such as, polyesters or polycarbonates, and the like.

Dilution Water

Turning back to the embodiment illustrated in FIGS. 1-9, a substantial amount of dilution water is added to the waste material to be processed, this being accomplished by injecting dilution water through pipe 92, such that sufficient dilution water is brought into contact with the waste material in the drum, via the curved stationary pipe 95. Dilution water is usually added to the pressure vessel drum D to accomplish water content in the drum D of between 30 percent and 75 percent by weight of total waste material and water in the drum, with approximately 70 percent being the amount in accordance with a particular embodiment. In accordance with another embodiment, the dilution water is introduced into the pressure vessel drum D through pipe 92 in an amount up to about 3 parts by weight dilution water to about 1 part by weight waste material, or an amount up to about 7 parts by weight dilution water to about 3 parts by weight waste material, or an amount from about 0.43 parts to about 3 parts by weight dilution water to about 1 part by weight waste material.

In accordance with embodiments of the invention, the dilution water may be substantially pure water, but may be potable or non-potable water. The dilution water may contain additives such as chemical aides described in more detail below.

The drum D is ordinarily rotated in the first rotative direction during the dilution water addition to enhance the contact of the waste materials with the dilution water.

Once all of the material is loaded into the vessel, the pressure vessel door is closed and sealed. The drum D is then rotated in the first rotative direction, during which a vacuum may be drawn in the chamber for a short period, about one to five minutes or five to ten minutes. One of the purposes of applying a vacuum at this stage is to prevent the buildup of pressure by the trapped non condensable gasses. At the end of the vacuum draw period, the vacuum is shut off and the system is isolated by closing the valve. After the vacuum draw period is complete, the dilution water is added to the drum D chamber.

Chemical Aides

In accordance with the embodiments of the invention, addition of suitable chemical aids during the agitation process may improve the quality of the pulped paper fraction. The extent of re-pulping may increase from the use of chemical aids. In addition, the pulp formed in the presence of certain chemical aids may be brighter and could reduce the extent of additional process steps. The chemical aid may be introduced into the pressure vessel before or after the drum door has been closed and locked and may be added to the pressure vessel before, with or after the waste material, or with the dilution water.

Thus in accordance with an embodiment of this invention, there may optionally be included at least one chemical aid selected from the group consisting of alkaline agent, buffer, bleaching agent, detergents, surfactants, solvents, dispersants, chelating agents, sequestrants, and mixtures thereof. These chemical aids either alone or in combination thereof may be used in their bulk form or in solution, preferably as solutions in water. Any amount of these chemical aids may be used to bring about the intended benefit, however, the preferred chemical aids and amounts are described in more detail below.

Any alkaline agent now known or hereinafter developed for use with cellulosic material which produces alkaline pH in water may be used with embodiments of this invention. Examples of such alkaline agents are lithium hydroxide, sodium hydroxide, potassium hydroxide and other alkali metal or alkaline earth element hydroxides. In accordance with an embodiment, sodium hydroxide may be used. In accordance with some embodiments, the total concentration of alkaline compounds in the solution used is in general selected to be greater than 0.5% of the total weight of the waste material and dilution water added to the pressure vessel drum. In accordance with some embodiments, it is chosen to be greater than 0.8% of the total weight of the waste material and dilution water added to the pressure vessel drum. In accordance with some embodiments, this concentration is kept at less than 5% of the total weight of the waste material and dilution water added to the pressure vessel drum. In accordance with some embodiments, the concentrations may be between 1% and 2.5%, or 3%, or up to 5% or up to 10% of the total weight of the waste material and dilution water added to the pressure vessel drum. In accordance with some embodiments, an alkaline agent such as sodium hydroxide is present in the dilution water solution at a concentration of at least about 1% based on the weight of dilution water and sodium hydroxide introduced into the inclined drum. More typically, sodium hydroxide is present in the dilution water solution at a concentration of at least about 2% based on the weight of dilution water and sodium hydroxide introduced into the inclined drum, while preferably in some cases sodium hydroxide is present in the dilution water solution at a concentration of at least about 3% based on the weight of dilution water and sodium hydroxide introduced into the inclined drum.

Any buffer material now known or hereinafter developed, which is useful for controlling the pH of the medium in the pH range of 8-10 may be used as a buffer in accordance with some embodiments of this invention. An example of such a buffer is sodium silicate, which acts as a buffer within this pH range.

In accordance with an embodiment of this invention, bleaching agents may be added to the waste material to obtain a pulped paper fraction having acceptable brightness values. In accordance with an embodiment of this invention, any bleaching agent now known or hereinafter developed for bleaching cellulosic material likely can be used to practice the present invention. In accordance with an embodiment of this invention, the amount of bleaching agent used may be from about 0.5 to about 1.3 weight percent of the total amount of dilution water and waste material added to the pressure vessel. Some embodiments of the invention include hydrogen peroxide as the bleaching agent in an amount of about 1 weight percent of the total amount of dilution water and waste material added to the pressure vessel for processing pulp mixtures containing the paper-containing and plastic containing waste materials. Sodium hypochlorite may also act as a suitable bleaching agent as well as a biocide in some embodiments.

In accordance with some embodiments of this invention, various other chemical aids such as detergents, surfactants, solvents, dispersants, chelating agents, sequestrants either alone or in combination thereof may be added to the waste material for use during re-pulping. All of these chemical aides now known or hereinafter developed for such purpose may be used in quantities sufficient to bring about the intended benefit. However, these chemical aides are used only if the pulp formed therefrom exhibits acceptable qualities.

In accordance with some embodiments of this invention, the preferred chemical aids are sodium hydroxide alone or in combination with hydrogen peroxide.

Re-Pulping Conditions

In accordance with embodiments of this invention, the processing of the waste material, which includes waste paper, is accomplished with the addition of heat and mechanical energy to sufficiently re-pulp and incidentally to sterilize the waste material. By virtue of the added dilution water, which increases the conduction of heat into the waste material being processed, waste materials that might otherwise produce an insulating effect for themselves and on other materials are completely and quickly penetrated by the required heat, thus avoiding the creation of pockets in which infectious materials could be protected from sufficient heat to accomplish complete re-pulping. Because of the reduction in size of the pulpable fractions of the wastes as they are processed, as previously described, and because the heat of the process causes the plastic fractions of the wastes when present to become heat distorted and to collapse into more compact forms, the entire amount of the waste is more completely agitated and therefore most completely contacted by the heat.

Turning back to the embodiment illustrated in FIGS. 1-9, in the first rotative direction, assumed to be clockwise when viewed from the open end of the drum, waste material is intercepted by the directional flighting 80 and is moved through the drum toward the back or closed lower end 56 of the drum. Simultaneously, the bi-directional lifting paddles 70, by virtue of the angular portion of each paddle, direct a portion of the waste material counter-currently toward the inlet end of the drum as each of the paddles comes in contact with the material during the rotation of the drum. This simultaneous backward and forward movement of materials within the drum by the action of the helical flighting 80 and the surfaces 76 of the novel lifting paddles 70 during the rotation of the drum D in the desired direction results in an advantageous and a very complete agitation of the materials being processed. Because of these actions and the added dilution water, the re-pulping of the pulpable materials of the waste materials is very effectively accomplished.

In some embodiments, the rotating drum apparatus is rotated at a speed of at least about 6 revolutions per minute (rpm), or at least about 8 revolutions per minute (rpm), or at least about 10 rpm.

In accordance with some embodiments of this invention, heat is added to the pressure vessel during the processing of the waste materials. In this case, steam may be advantageously added to the vessel by steam piping 90 and injected into the waste materials by injection piping 94 while the drum is being rotated in the first rotative direction; note FIG. 1. As previously described the addition of heat causes plastic materials when present to become softened and to separate while the drum is being rotated, thus allowing the paper fraction that is in close contact with plastic to be completely agitated and contacted with the added moisture and added heat. Desired pressure is maintained in the vessel A by suitable use of the valves of the pressure control system associated with the pressure pipe 60 and the vent connection 62. Valve 61a controls the pressure pipe 60, and valve 61b the vent pipe 62. Pipe 68 forms the connection to the interior of vessel A. The chemical aid as described previously can be additionally added as a liquid or a vapor into the steam line, or alternatively into the water line.

In accordance with some embodiments, a sufficient amount of steam is introduced during the agitation step so as to bring about internal temperature in the range of about 212° F. to about 285° F. and pressure in the range of about 0 psig up to about 50 psig or in the range of about 10 psig to about 50 psig. In accordance with some embodiments, a temperature of at least about 230° F. and a pressure of at least about 15 psig to reduce the time required to accomplish pulping is preferred.

In accordance with some embodiments, conditions are controlled so that the time required to accomplish re-pulping is generally from about 30 to 90 minutes, and typically the time required to accomplish re-pulping may be about 60 minutes.

In an embodiment where a sufficient amount of steam is introduced during the agitation step so as to bring about an internal temperature of about 275° F. and a pressure of about 30 psig to reduce the time required to accomplish re-pulping which may be about 40 to 80 minutes in some cases; again, the time required to accomplish pulping is typically about 60 minutes or less. In some embodiments, at least about 80 percent of the paper is re-pulped, and in some embodiments, at least 90 percent of the paper is re-pulped. In some embodiments, at least 65 percent of the paper present is re-pulped.

In accordance with some embodiments, the waste material is held at a temperature of at least about 212° F. for a period of at least about 90 minutes during the re-pulping step, at a pressure of approximately 15 psig, or at a temperature of about 285° F. for a period of at least 40 minutes, at a pressure of approximately 50 psig, or other combinations of pressure, temperature and time as have been shown to accomplish complete and effective re-pulping of contaminated waste. In accordance with some embodiments, a sufficient amount of steam is introduced into the pressure vessel during drum rotation while the waste material is being agitated so as to bring about an internal temperature of about 230° F. and a pressure about 18 psig to reduce the time required to accomplish re-pulping, which time is about 40 to 60 minutes, or 60 minutes. In accordance with other embodiments, the internal temperature is about 275° F. at a pressure of about 45 psig, the time to accomplish re-pulping being about 40 to 80 minutes, or about 60 minutes.

Post Re-Pulping Pressure Reduction

After the waste materials have been processed for a sufficient amount of time at a sufficiently high temperature, the steam injection to the system is shut off, the pressure vessel drum is vented to atmospheric pressure, and then the vacuum system 46 depicted in FIG. 9 is turned on while continuing to rotate the drum in the first rotative direction to induce a vacuum in the pressure vessel chamber to cool the treated waste material in the pressure vessel. As the vacuum is induced, the treated waste materials are cooled from the re-pulping processing temperature to a lower temperature. In accordance with some embodiments, the vacuum induced ranges from about −5 psig to about −15 psig or about −10 psig and reduces the temperature of the treated material to as low as about 170° F. or about 160° F. or as low as about 150° F.

Cooling Water

Cooling water is introduced into the pressure vessel to continue to cool the treated waste material in the pressure vessel to a discharge temperature below the elevated re-pulping processing temperature and to reduce odor emitted by the treated waste material. The addition of the cooling water reduces or eliminates odor that is or would otherwise be emitted when the treated waste material is discharged. Water and the treated waste material in the pressure vessel form a treated waste material slurry in the pressure vessel. While not wishing to be bound by theory, it is believed that the cooling water reduces the odor by reducing the temperature of the treated material or diluting the treated material slurry or both. It is also believed that the cooling water absorbs odorous compounds in the treated material that would otherwise be released into the surrounding atmosphere. Such odorous compounds may be present in the waste material or are produced during re-pulping of the treated waste material slurry or both. In some embodiments of this invention, sources of odorous compounds include food or beverage waste or both.

Turning back to the embodiment illustrated in FIGS. 1-9, an amount of cooling water is added to the treated waste material, this being accomplished by injecting cooling water through pipe 92, such that sufficient cooling water is brought into contact with the waste material in the drum D, via the curved stationary pipe 95. Cooling water is added to the pressure vessel drum D to accomplish total water content in the drum D of between 78 percent and 95 percent by weight of total waste material and water in the drum, with approximately 80 percent being the amount in accordance with a particular embodiment. In accordance with another embodiment, the cooling water is introduced into the pressure vessel drum D through pipe 92 in an amount such that a total amount of water present in the pressure vessel after the cooling step is at least about 3.5 parts by weight to about 1 part by weight treated waste material or at least about 3.8 parts by weight to about 1 part by weight treated waste material.

In accordance with embodiments of this invention, the cooling water is added to the treated waste material in an amount sufficient to reduce the temperature of the treated waste material in the pressure vessel by at least about 10° F., or by about 10° F. to about 50° F., or about 10° F. to about 30° F. In accordance with embodiments of this invention, the cooling water is added to the treated waste material in an amount sufficient to reduce the temperature of the treated waste material in the pressure vessel from a temperature of at least about 170° F. to a temperature of no more than about 140° F., or from a temperature of at least about 160° F. to a temperature of no more than about 140° F., or from a temperature of at least about 160° F. to a temperature of no more than about 130° F.

In accordance with embodiments of this invention, the cooling water is added to the treated waste material at a temperature up to about 130° F., or up to about 120° F., or from about 70° F. to about 130° F., or from about 70° F. to about 120° F., or from about 70° F. to about 115° F.

In accordance with embodiments of this invention, the cooling water is added to the treated waste material in an amount sufficient to increase total water content in the pressure vessel by at least about 5% by weight of the total water and waste material content of the pressure vessel, or at least about 10% by weight of the total water and waste material content of the pressure vessel, or by about 5% to about 40% by weight of the total water and waste material content of the pressure vessel.

In accordance with embodiments of the invention, the cooling water may be substantially pure water, but may be potable or non-potable water. The cooling water may contain additives such as odor modifiers and/or biocides.

Discharging Treated Waste

After cooling with the cooling water, the materials are discharged from the rotating vessel for the recovery of the re-pulped materials for recycling. In accordance with some embodiments, the discharged pulp fraction contains solid concentration of about 5 weight percent to about 50 weight percent based on the total wet weight of the discharged pulp fraction. Preferably the solid concentration is in the range of about 10 weight percent to about 25 weight percent based on the total wet weight of the discharged pulp fraction.

Further, as stated hereinabove, the waste paper fraction is essentially re-pulped. In accordance with some embodiments, the waste paper is at least about 80 percent re-pulped, or the waste paper fraction is at least about 90 percent re-pulped.

Turning back to the embodiment in FIGS. 1-9, the closure device 40 is opened and the drum D is rotated in the second rotative direction. In the second rotative direction, assuming counter-clockwise rotation, the processed waste materials are intercepted by the helical flighting 80 and are directed toward the inlet end of the drum D by the action of the helical flighting 80. As the drum D continues to rotate, the processed materials are also lifted and directed toward the inlet end of the vessel by the surfaces 75 of the "Y" shaped lifting paddles 70, as previously described.

The angular surfaces 75 and 76, on each side of the perpendicular surface of the paddles, function in an equal manner in either rotative direction, assisted of course in each instance by the vertically disposed member 72.

It is to be noted that the lifting paddles 70 are functioning in a counter-current or refluxing manner with respect to the helical flighting 80 during processing, with the surfaces 76 serving in a primary manner at such time. Only after the waste materials have been fully processed the rotative direction of the drum D is reversed, so as to enable the helical flighting 80 to discharge the material out over the lip 51 of the drum into a suitable discharge system. At this time of discharge, the surfaces 75 of the paddles 70 serve in a primary manner, in effect cooperating with the action of the helical flighting 80.

The processed materials are thus discharged from the vessel by the combined action of the helical flighting 80 and the surfaces 72 and 75 of the lifting paddles 70 during the rotation of the drum D in the second rotative direction. Because the outer lip 51 of the drum D protrudes beyond the outer rim of the vessel A, the discharged processed materials fall clear of the vessel. By virtue of the re-pulping of the paper materials, the volume of the processed waste material is reduced to approximately ⅓ of its original volume.

The rate of discharge of the processed materials, as is apparent to those skilled in the art, is dependent on the rate of rotation of the drum D, the size and frequency of the helical flighting 80, and the size and number of the lifting paddles 70 and these variables are dependent on the amount of material to be processed in a given amount of time and are not limited to a single combination of these variables.

Drain connection 64 is equipped with a suitable valve 66, which can be opened to enable moisture to be drained from the shell (pressure vessel A) upon excess accumulation thereof.

The processed materials are then directed to screens for the separation and recovery of the re-pulped paper fraction and further to collect the separated plastic materials. As described previously, the re-pulped paper fraction can then be subjected to further processing steps to form recycled paper sheet, tissue or board.

Recycled Paper Products

In some embodiments of the process of this invention, the re-pulped paper fraction is further subjected to a subsequent processing step to produce a paper product. In some embodiments, the paper product is either a paper tissue or a paper towel product. In some embodiments, the inventive process further includes utilizing the re-pulped paper fraction of the waste for the production of a recycle fiber-containing paper product such as recycle fiber-containing paperboard suitable for making paper plates, or recycle fiber-containing absorbent paper sheet, or recycle fiber-containing paper tissue, or recycle fiber-containing paper towel, or newsprint paper, or recycle fiber-containing cardboard product, including recycle fiber-containing corrugated cardboard paper product. So also, recycle fiber-containing writing paper is readily prepared.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the teachings have been described with respect to various embodiments, it should be realized these teachings are also capable of a wide variety of further and other embodiments within the spirit and scope of the appended disclosure.

We claim:

1. A method for treating waste material including waste paper comprising the steps of:
   introducing the waste material and dilution water into a pressure vessel;
   treating the waste material in the pressure vessel at an elevated processing temperature of at least about 212° F. and an elevated processing pressure greater than atmospheric pressure to form a treated waste material including substantially re-pulped waste paper;
   thereafter introducing cooling water into the pressure vessel so as to cool the treated waste material in the pressure vessel to a discharge temperature less than about 140° F. and reduce odor emitted by the treated waste material; and
   thereafter discharging the treated waste material from the pressure vessel,
   wherein the dilution water is introduced into the pressure vessel in an amount up to about 3 parts by weight of a total amount of water in the pressure vessel to about 1 part by weight waste material and the cooling water is introduced into the pressure vessel in an amount such that the total amount of water present in the pressure vessel after the cooling step is at least about 3.5 parts by weight to about 1 part by weight treated waste material.

2. The method of claim 1 wherein the treated waste material includes odorous compounds which are diluted by the cooling water.

3. The method of claim 1 wherein the waste material comprises organic material that includes odorous compounds or, when subjected to the treating step, forms odorous compounds which are diluted by the cooling water.

4. The method of claim 3 wherein the organic material comprises waste food, waste beverage, or both.

5. The method of claim 1 wherein the waste material includes polymeric waste material and the method further comprises the step of separating the substantially re-pulped waste paper from the polymeric waste material after the step of introducing the cooling water.

6. The method of claim 1 further comprising adding dilution water to the pressure vessel in addition to or along with the waste material for use during the treating step.

7. The method of claim 6 wherein the pressure vessel is mounted to rotate about an inclined axis equipped with suitable agitating means to thoroughly mix said waste material and dilution water.

8. The method of claim 1 wherein the dilution water is introduced into the pressure vessel in an amount up to about 3 parts by weight of a total amount of water to about 1 part by weight waste material and the cooling water is introduced into the pressure vessel in an amount such that the total amount of water present in the pressure vessel after the cooling step but before the discharge step is at least about 3.8 parts by weight to about 1 part by weight treated waste material.

9. The method of claim 1 wherein the elevated processing pressure is at least about 5 psig.

10. The method of claim 1 wherein the cooling water has a temperature less than about 115° F.

11. The method of claim 1 wherein the step of treating includes agitating the waste material in the pressure vessel.

12. The method of claim 11 wherein the agitating step is conducted at the elevated processing temperature and pressure for a sufficient time to substantially re-pulp the waste paper, such that components of the treated waste material can be separated by density and size.

13. The method of claim 1 wherein the step of treating includes introducing thermal energy into the pressure vessel to reach the elevated processing temperature and pressure within the pressure vessel.

14. The method of claim 1 wherein the step of treating includes introducing steam into the pressure vessel to reach the elevated processing temperature and pressure within the pressure vessel.

15. The method of claim 14 wherein the one or more chemical aides include at least one chemical selected from the group consisting of alkaline agents, buffers, bleaching agents, detergents, surfactants, solvents, dispersants, chelating agents, sequestrants, and mixtures thereof.

16. The method of claim 1 wherein the treating step includes introducing one or more chemical aides into the pressure vessel to facilitate re-pulping of the waste paper.

17. The method of claim 1 wherein the pressure vessel includes a rotatable drum for containing the waste material and the step of agitating comprises rotating the drum.

18. The method of claim 1 wherein the treating step is conducted for a time from about 30 minutes to about 90 minutes.

19. The method of claim 1 wherein said pressure vessel is an elongated vessel of generally cylindrical configuration mounted to be driven in rotation about its longitudinal axis.

20. The method of claim 1 further comprising the step of reducing the elevated processing pressure in the pressure vessel after the treating step and before the cooling water introduction step by use of a vent or eductor or both.

* * * * *